United States Patent
Schuermann et al.

(10) Patent No.: US 7,097,438 B2
(45) Date of Patent: Aug. 29, 2006

(54) FOAMING AGENT CHARGING AND MIXING DEVICE

(75) Inventors: Erich Schuermann, Sendenhorst (DE); Juergen Herrmann, Graefelfing (DE); Ansgar Jaeger, Lauf (DE); Marco Prigandt, Kahl (DE); Joerg Seidel, Burgthann (DE)

(73) Assignee: Demag Ergotech GmbH, Schwaig (DE)

( * ) Notice: Subject to any disclaimer, the term of this patent is extended or adjusted under 35 U.S.C. 154(b) by 141 days.

(21) Appl. No.: 10/461,517

(22) Filed: Jun. 16, 2003

(65) Prior Publication Data

US 2004/0009250 A1    Jan. 15, 2004

Related U.S. Application Data

(63) Continuation of application No. PCT/EP01/10603, filed on Sep. 13, 2001.

(30) Foreign Application Priority Data

Dec. 15, 2000  (DE)  ............................... 100 62 659

(51) Int. Cl.
*B29C 44/34* (2006.01)
(52) U.S. Cl. .................. 425/4 C; 425/457; 425/208; 425/562; 264/50; 264/53
(58) Field of Classification Search ................ 264/53, 264/50; 425/4, 557, 457, 208, 562
See application file for complete search history.

(56) References Cited

U.S. PATENT DOCUMENTS

| | | | |
|---|---|---|---|
| 3,809,519 A | | 5/1974 | Garner |
| 3,941,529 A | | 3/1976 | Klingebiel |
| 4,042,537 A | * | 8/1977 | Dahm et al. ................. 521/128 |
| 4,043,715 A | | 8/1977 | Hendry |
| 4,051,465 A | * | 9/1977 | Brody ......................... 365/117 |
| 4,124,308 A | * | 11/1978 | Sokolow ....................... 366/77 |
| 4,444,704 A | * | 4/1984 | Hira et al. .................. 264/45.5 |
| 4,933,115 A | * | 6/1990 | Krippl et al. .............. 261/18.1 |
| 5,098,267 A | | 3/1992 | Cheng |
| 5,124,095 A | | 6/1992 | Gianni et al. |
| 5,391,336 A | * | 2/1995 | Akitomo et al. ........... 264/46.4 |
| 6,328,916 B1 | * | 12/2001 | Nishikawa et al. ........... 264/53 |
| 6,435,853 B1 | * | 8/2002 | Teraoka et al. .............. 425/4 C |
| 6,783,710 B1 | * | 8/2004 | Walder ....................... 264/40.7 |

FOREIGN PATENT DOCUMENTS

| | | |
|---|---|---|
| CH | 575 284 | 5/1976 |
| DE | 32 46 622 A1 | 7/1984 |
| DE | 100 62 659 | 6/2002 |
| EP | 972626 A2 * | 1/2000 |
| EP | 1 000 723 | 5/2000 |
| FR | 1299590 | 6/1962 |

(Continued)

*Primary Examiner*—Robert Davis
*Assistant Examiner*—G. Nagesh Rao
(74) *Attorney, Agent, or Firm*—Oblon, Spivak, McClelland, Maier & Neustadt, P.C.

(57) ABSTRACT

A foaming agent charging and mixing device comprises at least one mixing device and one foaming agent metering device, wherein the foaming agent charging and mixing device may be arranged between an plasticating screw and a mold. In order to improve the foaming agent charging and mixing device in a manner that the mixing with foaming agent is facilitated and at the same time a risk of obstruction of the foaming agent metering device is avoided, the foaming agent metering device is alternately opened and closed through the mixing device during operation thereof for supplying foaming agent to the plastic melting.

17 Claims, 5 Drawing Sheets

FOREIGN PATENT DOCUMENTS

| | | |
|---|---|---|
| GB | 921912 | 3/1963 |
| GB | 2 179 886 | 3/1987 |
| GB | 2179886 A * | 3/1987 |
| JP | 2000084968 A * | 3/2000 |
| WO | WO 98/31521 | 7/1998 |
| WO | WO 02/047885 | 6/2002 |

* cited by examiner

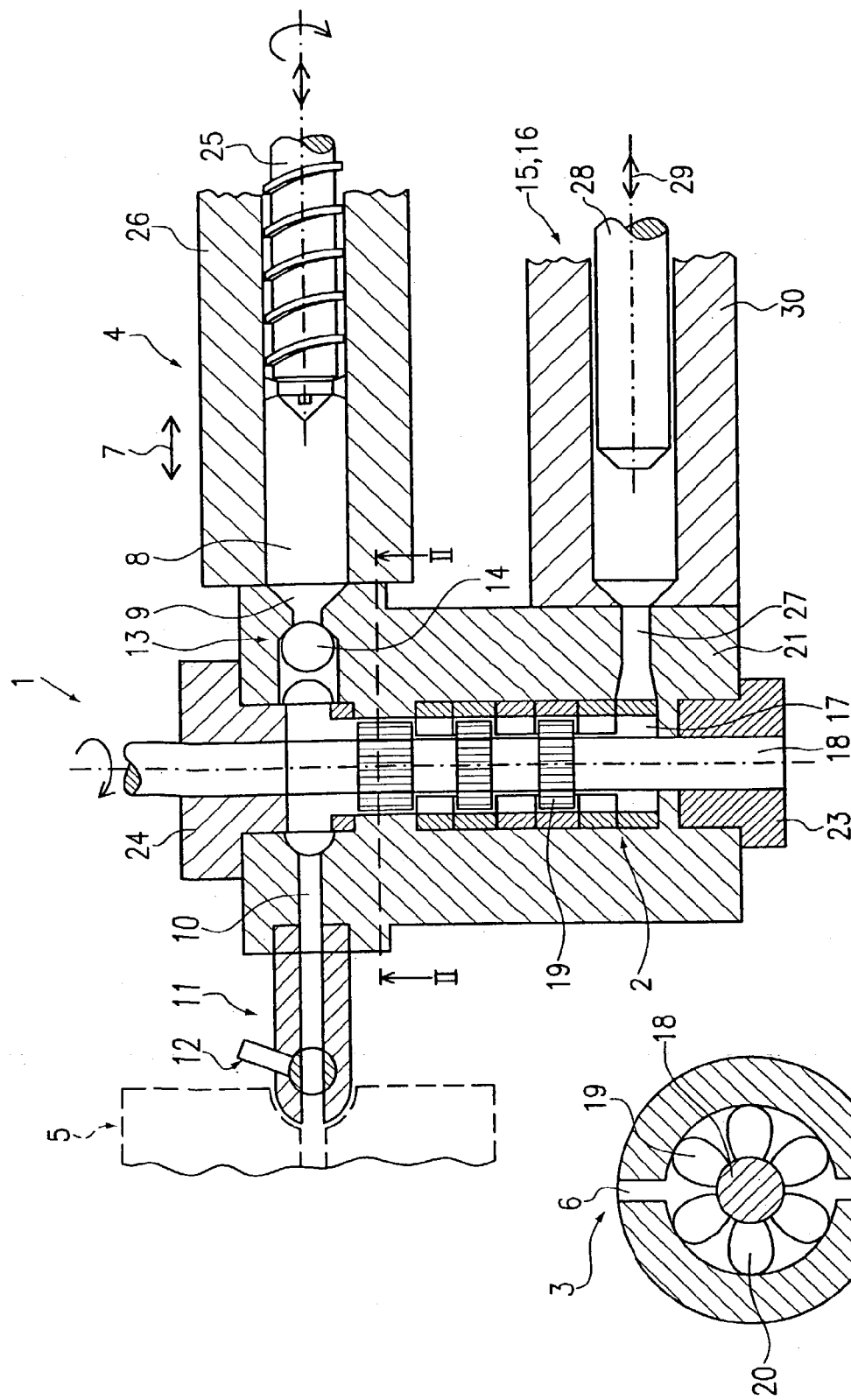

FOAMING AGENT CHARGING AND MIXING DEVICE

This application is a continuation of PCT/EP01/10603 filed Sep. 13, 2001.

BACKGROUND OF THE INVENTION

It is known from one of the basic patents discussing forming of plastics (U.S. Pat. No. 4,473,665 to Martine-Vvednesky et al, issued Sep. 25, 1984) that a solution of supercritical foaming or blowing agent with a plastic melt is desired to produce foamed plastic. In the '665 patent it was suggested to saturate the plastic pellets with the foaming agent in the extruder hopper (at elevated temperature). When the saturated pellets are subsequently melted at the temperatures and pressure of the screw/barrel, the foaming agent is supercritical and mixed with the melt as it is progressed down the screw. The '665 patent preferred this approach because it said direct injection of gas into the melt in the barrel of an extruder is a very difficult task because the gas had to be metered in small quantities and it was difficult to measure the gas which could escape the barrel. Introducing the foaming agent into the hopper is, however, not practical although possible. In spite of the teachings of the '665 patent, it is known to produce foamed plastic by introducing supercritical gas into the barrel of the extruder (see e.g. U.S. Pat. No. 5,158,986 to Cha et al, issued Oct. 27, 1992). However, that approach in turn has necessitated, as predicted by the '665 patent, the development of various orifice blowing agent metering arrangements such as disclosed in international publication number WO 99/32544, published Jul. 1, 1999, which attempt to include the screw as a wiping element to prevent clogging of the very fine orifices used to meter the supercritical gas. Special valving to prevent backward flow of the foaming agent has to be also provided such as shown in international publication number WO 00/58702. While devices constructed in accordance with the teachings of the references can function, it should be apparent that the devices have to include mechanisms designed to overcome fundamental problems necessitated by introducing foaming agent as a supercritical gas into the melt. In addition, expensive gas forming equipment is required to produce the supercritical gas. Further using the screw to both melt the plastic and mix the supercritical gas with the melt is not especially effective. The mixing rate has to occur at the same rate as that at which the melt is plasticated and while a screw helix which reduced in size is especially conducive to forcing a solid into a melt, that arrangement is not necessarily an optimum mixing arrangement for mixing a solution for the melt and the supercritical blowing agent because of very high shear forces.

It has long been known in the injection molding art to use a shot-pot or accumulator or a piston/cylinder to receive melt from a continuously rotating extruder and the shot-pot is then used to inject the shot into the mold. In fact, this arrangement was replaced by the reciprocating in-line plasticating screw used in today's injection molding machine. It is know e.g. from WO publications WO 98/31521, published Jul. 23, 1998 and WO 00/26005, published May 11, 2000, to use this arrangement to produce plastic parts where the outside of the part is made from non-foamed plastic and the inside of the part made from foamed plastic or vice-versa. In the arrangements illustrated, the shot-pot (or perhaps for one illustration the screw) injects both saturated and unsaturated plastic with a mixed blowing agent and unsaturated plastics. While it is possible for composite foamed/unfoamed plastic to be produced in this manner, it is desirable for control purposes to separately control the injection of each component.

BRIEF SUMMARY OF THE INVENTION

The present invention refers to a foaming agent charging and mixing device, comprising at least a mixing means and a foaming agent metering means, wherein the foaming agent charging and mixing means can be arranged between an plasticating screw and a mold.

In such a foaming agent charging and mixing device known from practice, plastic melting is supplied to the foaming agent charging and mixing device by the plasticating screw. This plastic melting is afterwards mixed with the foaming agent supplied to the plastic melting, wherein the foaming agent is distributed and solved in the melting. The plastic melting with the solved foaming agent is then supplied to a mold for injection molding, blow molding etc.

Corresponding foaming agents are for instance $CO_2$, $N_2$, He, Ne etc. The mixing means may be a static mixer.

The object of the device according to the invention is to improve a foaming agent charging and mixing device of the above-mentioned kind in that the metering of the foaming agent and the mixing with the foaming agent is facilitated and at the same time the risk of obstruction of the foaming agent metering means is avoided.

This object is solved in connection with the features of the preamble of claim 1 in that the foaming agent metering means is alternately opened and closed for supplying foaming agent to the plastic melting. By a virtually pulsating supply of foaming agent, the mixing of same with the plastic melting is significantly facilitated. By permanently opening and closing the foaming agent metering means, the common risk of obstruction is reduced or even prevented.

The alternating opening and closing of the foaming agent and metering means could e.g. be carried out by a separate mechanism that is part of the foaming agent metering means. To facilitate the whole structure thereof, the foaming agent metering means can alternately be opened and closed by a closing member associated to the mixing means.

However, the possibility exists that the foaming agent metering means pre-meters a corresponding foaming agent in gaseous state and afterwards this agent is supplied to the plastic melting. The metering can, however, be significantly improved if the foaming agent is in liquid state. Such a liquid foaming agent is not compressible and can therefore be metered much easier in the required quantity and may be supplied under pressure to the plastic melting. The temperature and pressure values in the foaming agent metering means are adapted such that the foaming agent directly changes from the liquid state into the super-critical state in which a diffusion and solution of the foaming agent in the plastic melting is significantly facilitated. The change from the liquid into the super-critical state shall take place as late as possible when adding the dosed foaming agent and preferably after discharging the liquid foaming agent by the metering means. For this purpose, a cooling means may be assigned to the foaming agent metering means.

Preferably, dosed $CO_2$ is added in its liquid state. Furthermore, the closing member assigned to the mixing means my also be part of the mixing means.

The plasticating screw used according to the invention is preferably an in-line reciprocating plasticating screw which has a number of advantages in case it used together with the so-called shot-pot. However, the device according to the invention also can work with conventional extruders. The mold used according to the invention is preferably a mold applied to a conventional toggle-type clamp although direct pressure clamps can be used and conceptually the mold can also be replaced by a die although the invention has been particularly developed for filling conventional molds which are initially vented to atmosphere. The speed or velocity profiling used in conventional injection molding and pressure injection profiling used in conventional injection molding may also be used for the shot-pot according to the invention and especially for the mold. Preferably the velocity is controlled to ensure a consistent pressure drop through a nozzle while the mold fills.

It is also possible to arrange two plasticating screws to inject different components in the mixing chamber and/or the mold, wherein both screws are connected to the mixing chamber.

The arrangement of two plasticating screws is preferably used for sandwich construction in the mold. For example, an expensive plastic may be used for the part outside of the sandwich to obtain a fine surface on the part whereas the inside of the part is filled with the coarse plastic which is commonly said to be a "filler". According to the invention it is also possible to inject melt first in the mold and followed by a foamed plastic. The pure melt is used to obtain the fine surface. It is also possible to place the foam on the outside of the part and the melt in the inside.

In case only melt and foamed plastic are used, it is possible according to the invention to use only one plasticating screw, wherein together with the directional switching means melt or foamed plastic may be supplied to the mold from the plasticating screw and/or the shot-pot.

In case two screws are used, an expensive plastic may be used for the part outside which can be foamed because the cell sizes, which are not microcellular, still produce a fine finish and a very cheap filled plastic can be used on the outside. Alternatively, the expensive plastic can be on the outside and the cheap plastic foamed to reduce the costs on the inside.

It is also possible to sequentially inject using only the shot-pot by the two injection screw in arrangements to produce a foamed outer skin and a foamed inner core.

The velocity profile and/or pressure profile of the injection of both materials will be controlled so that the possibility exists to vary the rate as the mold fills.

Correspondingly, the invention and, in particular, the shot-pot may be used for two injection screws or two units tied to a mold to allow molding of cheap/expensive plastics either or both of which can be foamed.

In order to be able to continuously supply foaming agent to the plastic melting, the foaming agent metering means may comprise at least two inlet bores opening into a device housing, said inlet bores being alternately opened and closed. That means that only one of the two inlet openings is opened while the other one is closed. Such a foaming agent metering means can be easily realized and controlled.

In order to be able to retrofit the foaming agent charging and mixing means according to the invention and to also use it in conventional plasticating screws and molds, the foaming agent charging and mixing means may be formed as a module which can be releasably arranged between the plasticating screw and the mold. The device is for instance flange-mounted in front of a screw-type cylinder of an plasticating screw of a conventional plastic machine. The connection with the mold can be implemented in a similar manner. The module can also be formed in a manner that it has substantially standardized joining portions with corresponding connections that can be connected with conventional molds.

In order to design the foaming agent charging and mixing device in a possibly compact form that requires few space between the plasticating screw and the mold, the foaming agent charging and mixing means may extend transversely towards the longitudinal direction of the plasticating screw, and a side opening connectable to the discharge end of the plasticating screw can be formed in the device housing.

In relation to this side opening, the mold may for instance also be arranged at a right angle to the plasticating screw or at another angle to the plasticating screw. Accordingly, a discharge opening can be formed in the device housing, in particular opposite to the side opening. In the case of such an opposing arrangement, the plasticating screw and the mold are substantially arranged on a level on opposite sides of the foaming agent charging and mixing device.

In order to ensure that only in the case of a discharge to the mold a relief of the pressurized plastic melting and thus a foaming of the melting by the foaming of the foaming agent takes place, a discharge nozzle may be assigned to the discharge opening through which the plastic melting with the solved foaming agent can be discharge into the mold.

For the discontinuous discharge of plastic melting with the foaming agent, it is possible that the discharge opening and/or the discharge nozzle can be closed by in particular one closure valve. In this manner a corresponding plastic melting can be conditioned in the foaming agent charging and mixing device as long as the foaming agent is appropriately metered, mixed-in and solved. Only then is the plastic melting with the solved foaming agent discharged via the discharge nozzle and discharge opening and relaxes in the mold.

In order to operate the foaming agent charging and mixing means independent of the plasticating screw and in particular independent of a pressure prevailing there, a closure means may be assigned to the side opening. When the closure means is open, plastic melting is supplied by the plasticating screw to the foaming agent charging and mixing device and after supply of a desired quantity, the closure means may be closed. Afterwards, the metering of the foaming agent, its mixing-in and solution can take place. Moreover, the discharge and relief of the plastic melting with the solved foaming agent may take place independent of the plasticating screw, i.e. when the closure means is closed.

Various embodiments for such a closure means are conceivable. Such an embodiment is a return valve, which allows an entry from the plastic melting to the foaming agent charging and mixing means only by a respective pressure load by the plasticating screw. As soon as the plasticating screw stops supplying plastic melting and the pressure exerted by the plasticating screw is correspondingly low, the return valve closes.

A further embodiment for such a closure means is a non-return flap. This flap closes as soon as the pressure exerted by the plasticating screw is lower than in the foaming agent charging and mixing device.

It is also possible to prevent a backflow of the foaming agent/melting mixture into the screw-type cylinder of the plasticating screw by an actively operated, hydraulic closure bolt.

In order to be able to store plastic melting before or after mixing with the foaming agent, the device housing may comprise at least one collection means for plastic melting. In this connection, it must be taken care that in the case of a plastic melting with a foaming agent already mixed-in the pressure in the collection means is sufficiently high to prevent an early foaming of the foaming agent.

To enable different sizes of collection means in a simple manner, the collection means may releasably be attached at the device housing. In this manner, a greater or smaller collection means may be arranged, depending on the desired type of storage.

A simply designed collection means, which also has a variable volume, can be formed by a piston-cylinder unit.

In order to be able to maintain a sufficiently high pressure in the collection means in this connection, the piston of the piston-cylinder unit may be pushed telescopically in a braked manner.

In order to mix the plastic melting by the mixing means in particular in view of the foaming agent introduced, the collection means may essentially be arranged on a side of the mixing means opposite the plasticating screw and/or mold. This can be implemented in a simple manner in that a channel connection is formed between the side opening and the collection means and/or between the discharge opening and the collection means, wherein the mixing means is arranged in the channel connection. In this connection, it must be taken care that the same channel connection may connect the side opening and the collection means as well as the discharge opening and the collection means. It is also conceivable that separate channel connections between the side opening and the collection means and the discharge opening and the collection means are arranged. It must further be taken care that for instance in the case of two channel connections, two mixing means can also correspondingly be arranged in these channel connections.

A simple embodiment for a mixing means may be seen in that this mixing means comprises a mixing shaft and mixing elements outwardly projecting therefrom.

In order to simply enable in this connection the opening and closing of the foaming agent metering means, the foaming agent metering means may be closable by mixing elements and/or by closing elements outwardly projecting from the mixing shaft upon rotation of the mixing shaft. The reciprocal opening and closing of the inlet openings of the foaming agent metering means analogously takes place.

In order to enable in particular a two-component process in a simple manner by means of the gas charging and mixing device according to the invention, a directional switching means may be arranged in the device housing. This directional switching means directly connects in a position the mold with the plasticating screw so that plasticized plastic material can be supplied without the foaming agent. In at least one further position of the directional switching means, this means establishes a connection between the collection means and the mold so that mixture of foaming agent and plasticized plastic material contained in the collection means can be supplied to the mold. A further position of the directional switching means is conceivable in which the mixture from the collection means is first of all supplied again to the mixer or plasticating screw and afterwards e.g. to the mold.

For a simplified portioning of the foaming agent, the foaming agent supplied to the foaming agent metering means may be liquid.

The foaming agent metering means may be formed in various manners. A simple embodiment can be seen in that the foaming agent metering means comprises a reciprocating pump. By means of this pump, corresponding quantities of the foaming agent of the melting can be supplied under pressure and depending on the operating cycle to the reciprocating pump at a corresponding frequency.

In order to be able to operate the reciprocating pump in a simple manner and to possibly move it simultaneously precisely for metering the foaming agent, a linear drive in particular having an integrated path measuring system may be assigned to the reciprocating pump.

In order to permanently keep the pressure in the reciprocating pump at a high level, the reciprocating pump may have on the high pressure side a non-return flap.

In order to operate the reciprocating pump relatively independent from the foaming agent source, the reciprocating pump may have a foaming agent supply portion. A corresponding connection of the foaming agent source can be connected to this foaming agent supply portion. In order to prevent in this connection foaming agent from being returned in the direction towards the foaming agent source, a non-return flap loaded in particular in the direction towards the closing position may be assigned to the foaming agent supply portion.

Of course, it is also possible that other mechanisms are used instead of the above-mentioned non-return flap.

The cooling means of the foaming agent metering means may be structured in various manners. A simple embodiment without great construction effort can be seen in that foaming agent for cooling is cyclically relieved in the cooling means.

In a simple embodiment, the mixing means may comprise at least one mixing shaft. The mixing shaft may be supported displaceably in the axial direction. In order to simplify the support of the mixing shaft in case of high forces occurring, this mixing shaft may be arranged fixedly in the axial direction and it may be arranged coaxially in a cylinder tube.

Due to the possibly high occurring pressures in this connection, it is furthermore advantageous if the mixing shaft is supported at its two shaft ends.

For a favorable mixing of melting with foaming agent supplied, which is super-critical in the melting, the mixing shaft comprises two substantially radially outwardly projecting mixing elements. In addition to these mixing elements, the above-mentioned closing member may be arranged on the mixing shaft and may be rotatable therewith. The mixing elements may be rhomboidal mixing elements, so-called Twente-mixing elements or they may be other mixing elements in particular known from injection molding.

It is also possible to use a mixing shaft having a helical geometry. In this connection, the closing member may also be arranged separately from the mixing elements on the mixing shaft. However, there is also the possibility that at least one of the mixing elements is formed as a closing member.

In order to supply the mixing elements with melting regularly and well distributed relative to the mixing shaft, the mixing elements may be flown against parallelly with melting.

In order to be able to supply melting in a simple manner to the mixing shaft and thus to the mixing elements, the melting inlets and outlets may be arranged radially to the mixing shaft.

In order to be able to simultaneously supply melting at different positions along the mixing shaft, at least two melting inlets spaced apart in the axial direction may be formed. Via these melting inlets, melting is supplied to the corresponding mixing elements simultaneously at different positions of the mixing shaft.

If in the case of two melting inlets it is desired to mix the melting by the mixing elements of the mixing shaft homogeneously and for the favorable distribution of the foaming agent, the melting inlets may be assigned in particular to shaft ends of the mixing shaft. In this connection a foaming agent metering means is assigned to each of the melting inlets. In order to easily simultaneously enable a discharge of the melting mixed with foaming agent, one melting outlet may substantially be arranged centrally between the two melting inlets. The melting outlet may be arranged at a radial position relative to the mixing shaft other than the two melting inlets. An example for such an arrangement of the melting outlet is an arrangement relative to the mixing shaft diametrally opposite to the melting inlets.

The invention further refers to a directional switching means, in particular to a foaming agent charging and mixing means according to the above-mentioned kind, which can be switched between a supply of a material of at least two different sources to a consumer. By using such a directional switching means, plastic melting without the addition of foaming agent may for instance directly be supplied to the mold or after adding the foaming agent and storage of the mixture in the collection means.

In order to be able to simply switch between a supply from one of these two sources to the mold as a consumer, the directional switching means comprises an external body and an internal body rotatably supported therein, wherein an outlet of the external body can be connected to one of at least two inlets of the external body by means of a connection channel in particular eccentrically arranged in the internal body.

In this connection, one of the inlets is assigned to the plasticating screw and the other one of the inlets is assigned to the collection means, while the discharge of the material supplied via the inlets is carried out via the one outlet directly to the mold. By simply twisting the internal body, the connection channel selectively represents a connection between the outlet and one of the inlets.

In order to be able to twist the internal body about 360° in the external body, the outer and inner body may have a circular cross section. It must be taken care that the external body is formed as a circular ring in whose inner bore the internal body is rotatably supported. The inlets and outlets are formed in the annular external body.

The connection channel could extend in curved form in the internal body in order to establish in various rotary positions of the internal body corresponding connections of outlet and inlet. However, an internal body is more simple to manufacture in which the connection channel extends at a straight line in the internal body. In order to be able to connect the outlet with the two inlets by one single connection channel in corresponding positions of the internal body, a center line of the connection channel is arranged parallelly offset with respect to a diameter of the internal body, whereby the connection channel extends eccentrically in the internal body.

In order to be able to establish in this connection in a simple manner the various connections, the outlet and an inlet of the external body may oppose one another and a center line connecting same may coincide with the center line of the connection channel in the outlet thereof and in the position connecting the inlet.

Although the possibility exists that the connection channel is formed with smaller dimensions than the outlet and inlets or with greater dimensions, the inlets, however can also be formed differently in dimension and/or also differently in dimension to the outlet.

In such an embodiment to be easily manufactured, the outlet, inlets and the connection channel may have the same diameter.

In order to not only connect the inlets and outlets in one level with one another, the directional switching means may have a substantially cylindrical internal body.

In order to be able to move in a simple manner to different inlets and outlets, the connection channel may substantially be arranged along an axis of rotation of the cylindrical internal body and may have a number of branching channels, to which at least two outlets and/or inlets can be associated in the external cylinder by rotation of the internal body.

In order to be able to form corresponding connections of inlets and outlets in the foaming agent charging and mixing device, the external body may have five outlets/inlets with associated channels, and the internal body may have six branching channels, wherein depending on the rotary position of the internal body, different outlets/inlets and branching channels are in communication. In a rotary position, the plasticating screw may for instance be connected to two mixing means. In a further rotary position, the collection means may be connected to a mold or the like. In an even further rotary position, an plasticating screw connected to the foaming agent charging and mixing device can be connected to the mold and in a further rotary position the mixing means and also the individual mixing elements may be connectable to the mold. Finally, a return of the mixture from the collection means to the mixer or plasticating screw may take place.

BRIEF DESCRIPTION OF THE DRAWINGS

Advantageous embodiments of the invention will now be described in detail by means of the enclosed drawings.

FIG. 1 shows a longitudinal section through a first embodiment of a foam charging and mixing device according to the invention;

FIG. 2 shows a section along the line 11—11 of FIG. 1;

DETAILED DESCRIPTION OF THE INVENTION

Figure 3:
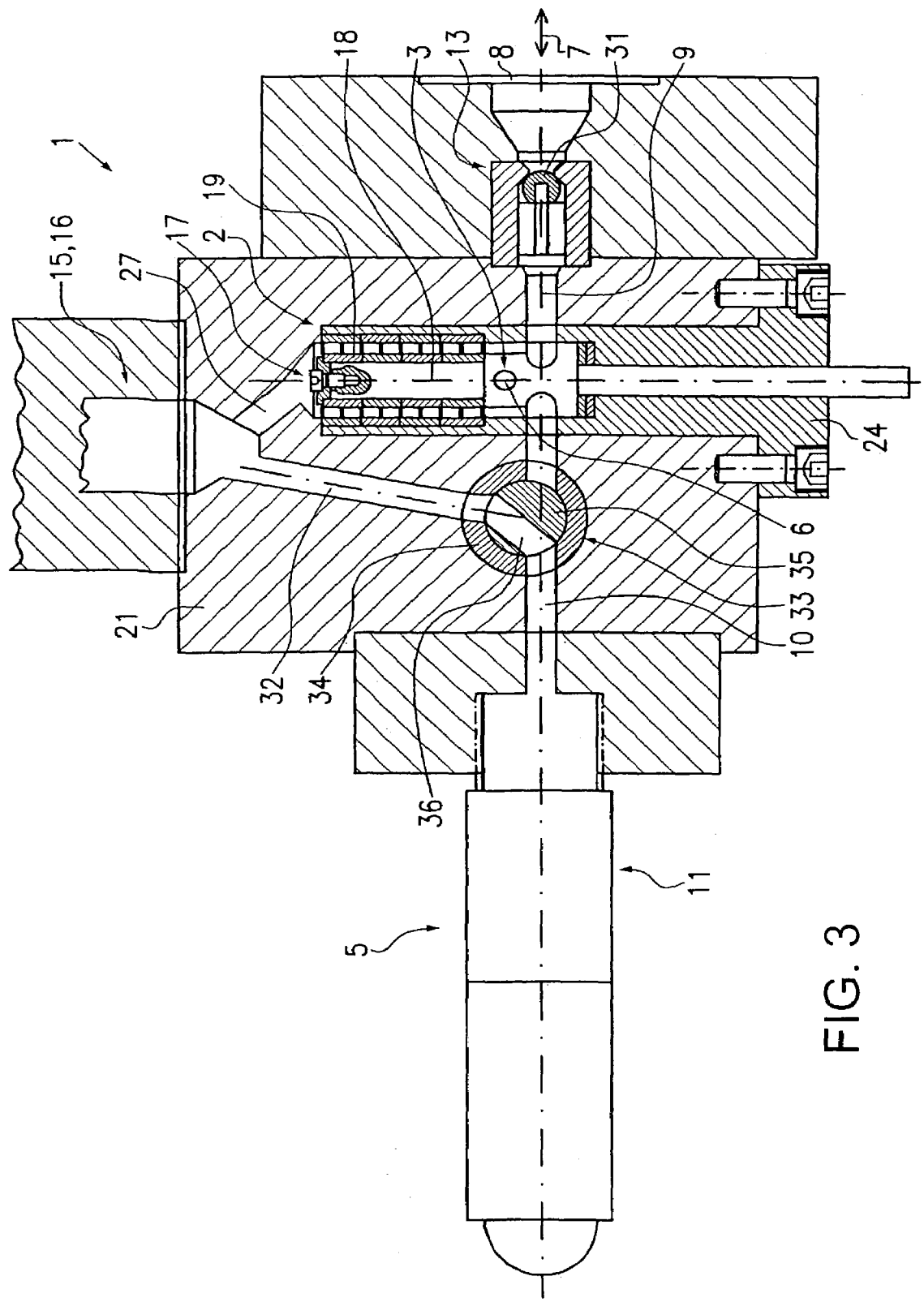
FIG. 3 shows a longitudinal section analogously to FIG. 1 through a second embodiment.

FIG. 1 shows a longitudinal section through a foaming agent charging and mixing device 1 according to the invention. This device comprises a mixing means 2 and a foaming agent metering means 3, see FIG. 2. These are arranged in a device housing 21.

The mixing means 2 comprises a mixing shaft 18 which is rotatably supported in bearing elements 23, 24 at both ends of the device housing and which is guided through the bearing element 24 towards the outside to a drive that is not shown. A number of mixing elements 19 project at the mixing shaft within the device housing 21. A plasticating screw 4 and a mold 5 are arranged adjacent to the bearing element 24 at the side of the device housing 21. The foaming agent charging and mixing device 1 is formed as a module, which can be arranged between the plasticating screw 4 and the mold 5 and which is in particular flange-mounted at the discharge end 8 of the plasticating screw 4.

In the embodiment shown, the plasticating screw 4 is formed as a barrel plasticating screw with an plasticating screw housing 26 encompassing the barrel plasticating screw. The barrel plasticating screw 25 is adjustable in the longitudinal direction 7 and is also supported in the plasticating screw housing 26 in a manner rotatable around its respective longitudinal axis, A side opening 9 of the device housing 29 is assigned to the discharge end 8 of the plasticating screw housing 26. A closure means 13 in the form of a non-return flap 14 is arranged in this side opening 9.

A discharge opening 10 is formed in the device housing 21 diametrally relative to the device housing 21 opposite to the side opening 9. A discharge nozzle 11 is connected to this discharge opening, with a closure valve 12 being arranged in said throttle means. A partially shown mold 5 is connected to the discharge nozzle 11. This mold may be an injection molding tool, for blow molding etc.

A passage 27 is formed in the device housing 21 adjacent to the other bearing element 23. This passage connects a channel connection 17 within the device housing 21 which substantially extends transversely to the longitudinal direction 7 of the plasticating screw 4 and in which the mixing means 2 is formed, comprising a piston-cylinder unit 16 as collection means. A piston 28 is displaceably supported in the adjustment direction in a piston cylinder 30.

FIG. 2 shows a section along line 11—11 of FIG. 1. It can be derived from this Figure that the foaming agent metering means 3 comprises at least two inlet bores 6, 22. Through these inlet bores, foaming agent, e.g. $CO_2$, can be supplied by a pump which is not shown and a corresponding reservoir container to the channel connection 17 in the area of the mixing means 2 in particular in an actively cooled manner. The two inlet bores 6, 22 are arranged diametrally opposite relative to the mixing shaft. Corresponding mixing elements 19 and/or a closing member 20 is arranged in the area of the inlet bore on the mixing shaft. These mixing elements reciprocally close and open the inlet bores 6, 22 for the pulsating discharge of foaming agent into the plastic melting processed by the mixing means 2.

It is also possible that the inlet bores 6, 22 are formed in the device housing for instance at a right angle to each other or at another angle inclined to each other. There is also the possibility that more than two inlet bores are provided. In these alternative embodiments, corresponding inlet bores are reciprocally closed and opened by the mixing elements 19 or the closing elements, respectively.

FIG. 3 shows a longitudinal section analogously to FIG. 1 as a further embodiment of a gas charging and mixing device 1 according to the invention. Equal parts are designated by equal reference numerals and are only partially mentioned.

The embodiment according to FIG. 3 differs in particular from the embodiment according to FIG. 1 by the arrangement of the collection means 15 relative to the device housing 21 and by the additional arrangement of a directional switching means 33 in the device housing.

The collection means 15 may as in the first embodiment be formed as a piston-cylinder unit 16. This piston-cylinder unit is arranged in FIG. 3 perpendicularly to the mold 5 from which only a corresponding discharge nozzle 11 can be seen. That means that the collection means 15 is substantially arranged in extension of the mixing means 2 so that plasticized plastic material mixed with foaming agent can be supplied to the collection means 15 from this mixing means via a passage 27 at the end of the channel connection 17. In order to be able to supply material from the collection means to the mold 5, a supply channel 32 is formed in the device housing 21. This supply channel extends from the collection means 15 in the direction of a directional switching means 33, which is arranged in FIG. 3 in a position connecting the collection means 15 and the mold 5. The directional switching means 33 comprises an external body 34 in which an internal body 35 with a connection channel 36 is rotatably supported. Two inlets 38, 40 are formed in the external body, said inlets communicating with the supply channel 32 and the plasticating screw 4, respectively. Furthermore, the external body comprises an outlet 41 which is connected to the outlet opening 10 and thus to the mold 5. The connection channel 36 is eccentrically arranged in the internal body 35, wherein its centerline 36 is arranged in a manner parallel offset to a diameter of the internal body. The connection channel may upon rotation of the internal body around a corresponding angle connect the discharge opening 10 in the device housing 21 with the plasticating screw. (not shown) or the side opening 9. In this case, the connection between the outlet 37 and the inlet of the external body 34 is established, which oppose one another and whose center line 41 connecting them coincides with the center line 40 of the connection channel 36 in case of a corresponding position of the internal body for connecting the inlet 38 with the outlet 37. In the case of such a position of the internal body 35, a direct supply of plasticized plastic material from the plasticating screw to the mold takes place.

The internal body 35 is furthermore rotatable in a manner that the mold is locked in its connection to the collection means 15 and towards the plasticating screw. Thus, a separate closure valve 12, see FIG. 1, can substantially be renounced in the embodiment according to FIG. 3.

In the embodiment shown, the internal and external body are circular or annular and the diameters of outlets, inlets and connection channel are equal.

In FIG. 3 also a machine CPU controller is illustrated that control the discharge nozzle 11, the gear, the pump for $CO_2$, the directional switching means 33, etc. The $CO_2$ is under a pressure of about 60 bar in the bottle and by the pump the pressure will be raised up to about 700 bar.

By the machine control it is also possible to control the speed or velocity profiling and pressure injection profiling.

Figure 4:
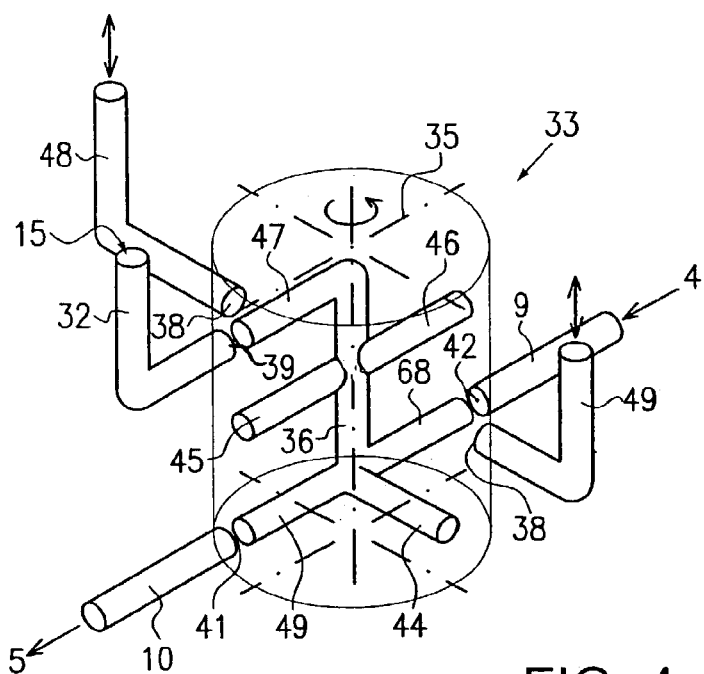
FIG. 4 shows a perspective view of a further embodiment for a directional switching means.

FIG. 4 shows a perspective view of a further embodiment of a directional switching means 33.

This means has a cylindrical internal body 35 in which a connection channel 36 extends in the rotary axis direction. A number of branching channels 43, 44, 45, 46 and 47 as well as 68 branch off from this central connection channel 36. The cylindrical internal body 35 is either rotatably supported in a corresponding opening in the device housing 21 or in the external body 35, see FIG. 3, arranged there. In the device housing 21 and possibly in the external body 34, corresponding outlets and inlets 41, 42, 38 39 are arranged from which corresponding channels 32, 48, 9,10 and 49 extend.

In the rotary position of the cylindrical internal body 35 shown in FIG. 4, the branching channel 37 is connected to the supply channel 32, the branching channel 49 is connected to the discharge channel 10 and the branching channel 68 is connected to the side opening or to the side channel 9. Thereby melting may be supplied to a mold 5 directly by the plasticating screw and by the collection means 15.

Further rotary positions are possible in which for instance the plasticating screw 4 is connected to the channels 48, 49, which lead to corresponding mixing means. Finally, the two mixing means in a further rotary position may be connected to the mold 5 via channels 48, 49 and the branching channels 45, 46 via the further branching channel 44.

Of course further branching channels are possible, which for instance establish a connection only between the storage means and the mold 5, between the plasticating screw and the mold etc.

Figure 5:
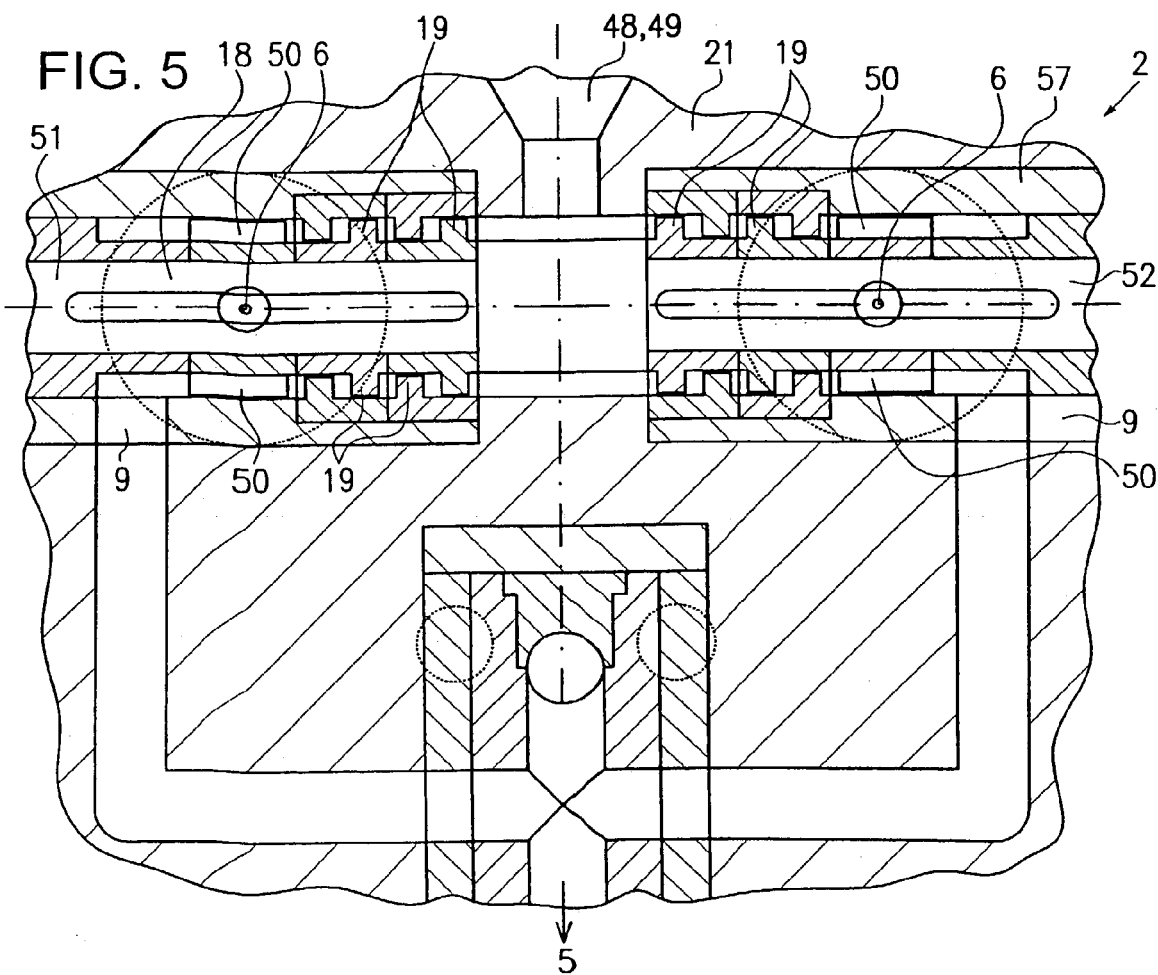
FIG. 5 shows a section through a second embodiment of a foaming agent charging and mixing device with a double melting supply.

FIG. 5 shown a cut similar to FIGS. 1 and 3 through a further embodiment of the foaming agent charging and mixing device according to the invention.

This embodiment shows in particular a support of a mixing shaft 18 at its two ends 51, 52. The mixing shaft 18 is supported in the device housing 21 in a corresponding cylindrical body or cylindrical opening coaxially to this opening. A number of mixing elements 19 are arranged on the mixing shaft, said mixing elements extending radially outwardly$_{[FJN4]}$. The mixing shaft may also have a helical geometry$_{[FJN5]}$. Two side openings are arranged adjacent to the two ends 51, 52 of the mixing shaft 18, through which said side openings melting can be supplied to the mixing shaft 18. The melting may be simultaneously supplied by an plasticating screw 5 to the two side openings 9.

An inlet bore 6 for supplying in particular liquid foaming agent to the melting is arranged adjacent to each of the side openings 9. Analogously to FIG. 2, two of these inlet bores may be arranged in particular diametrally opposite. The inlet bores may all be supplied by a foaming agent metering means. Corresponding closing members are arranged in the area of the inlet bores 6 on the mixing shaft 18, said closing members can also be part of the mixing means.

A melting outlet 48, 49 is arranged substantially centrally between the two side openings 9 as melting inlets. From this melting outlet, the melting, see FIG. 4, can be supplied to the directional switching means.

It must be noted that instead of the one mixing shaft according to FIG. 5, two mixing shafts can also be arranged. Each of these mixing shafts is exposed to small forces in the axial direction only due to the double supply of the melting and the support at both ends, since the pressures within the melting basically compensate due to the double supply.

Figure 6:
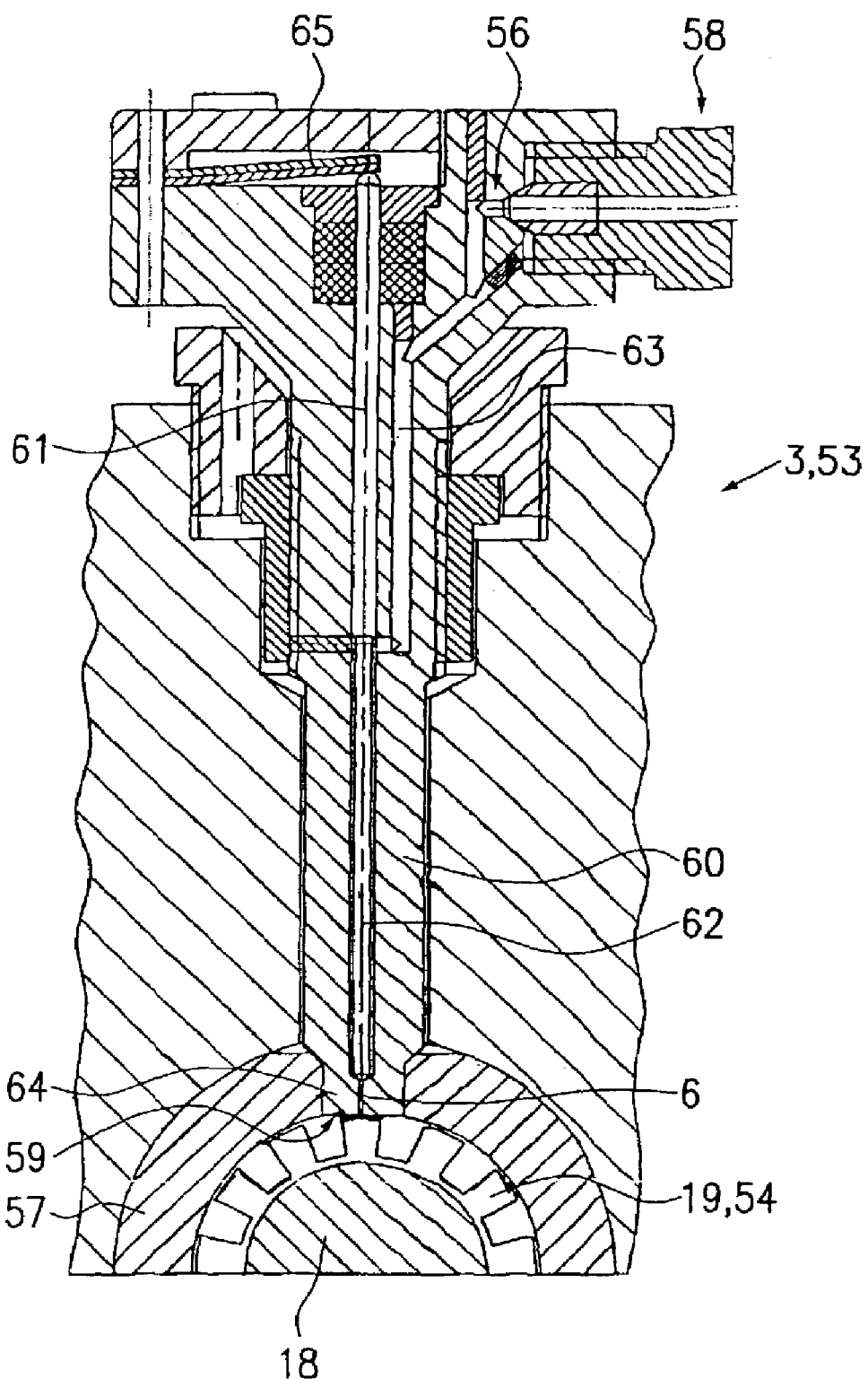
FIG. 6 shows a longitudinal section through a first embodiment of a valve-like foaming agent metering means.
Figure 7:
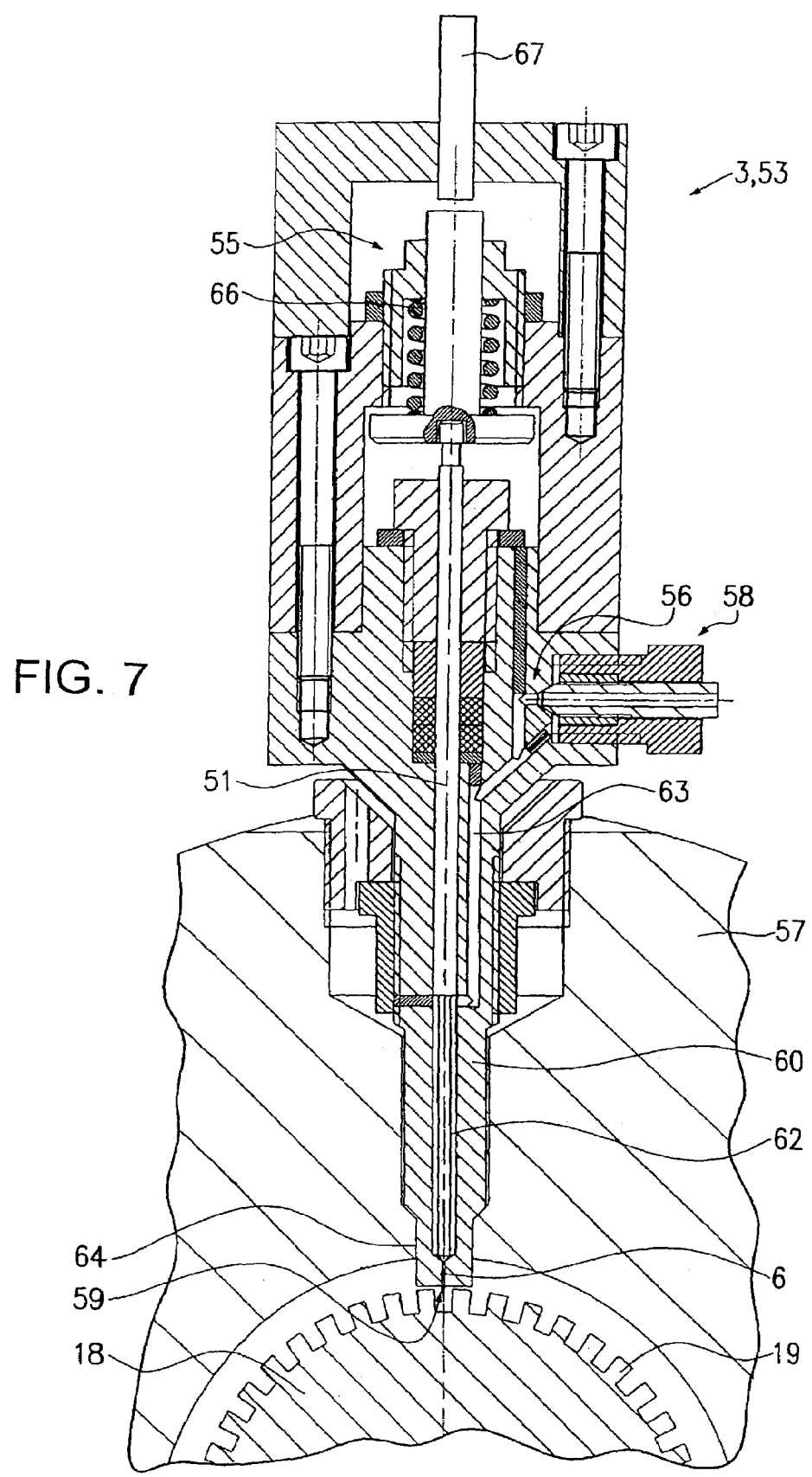
FIG. 7 shows a longitudinal section analogously to FIG. 6 through a second embodiment of a foaming agent metering means.

FIGS. 6 and 7 show two different embodiments for an injection valve 53 as a part of the foaming agent metering means 3.

The injection valve 53 is arranged radially to the mixing shaft 18 at the housing 21. It ends with an end face 59 adjacent to the mixing elements 19 or the closing member 54. At least one inlet bore 6 is arranged in the area of this end face 59, said inlet bore being opened by the corresponding closing member 54 or mixing element and being opened between two such elements 19.

The inlet bore 6 is arranged at a lower end 64 of an injection cylinder 60 of the valve 53. A portioning channel 62 is formed in the injection cylinder 60, said portioning cylinder ending with the inlet opening 6. The inlet opening 6 has a smaller diameter than the portioning channel 62. An injection piston 61 is longitudinally displaceably supported in the portioning channel 62. A non-return flap 65 engages the injection piston 61 at its end opposing the inlet opening 6.

A supply channel 63 is arranged in the injection cylinder parallel to the injection piston 61 or to the portioning channel 62, said supply channel radially opening into the portioning channel 62 and comprising a foaming agent supply portion 45 at its other end. There, a supply terminal 58 is releasably attached at the valve through which in particular liquid $CO_2$ can be supplied.

A further injection valve 53 is shown in FIG. 7 in an analog longitudinal section to FIG. 3. This injection valve differs from the embodiment according to FIG. 6 in particular by the operation of the injection piston, which according to FIG. 7 is part of a reciprocating pump 55. This injection piston is assigned to a linear drive means and the position of the injection piston 61 can be determined through a corresponding measuring system. Instead of a load by a non-return flap 65, a return spring 66 is arranged in FIG. 7 which presses the injection piston 61 in the direction towards the inlet opening.

In the embodiment according to FIG. 7, the lower end 64 partially projects into a mixing space surrounding the mixing shaft 18 and a cylindrical body 57 according to FIG. 6 is not formed as a separate body in FIG. 7 but the device housing is on the whole formed as such a cylindrical body 57.

In order to limit the stroke of the injection piston 61, the injection valve 53 according to FIG. 7 has an abutment element 67. This element is assigned to the end of the injection piston 61 opposite to the inlet opening 6. Furthermore, the injection piston 61 according to FIG. 7 is formed of a plurality of pieces, wherein an approximately pin-like injection piston 61 is releasably attached at its upper end at a reversed T-shaped piston. This reversed T-shape piston is loaded by the return spring 66.

The function of the device according to the invention will now be briefly described with reference to the Figures.

According to the foaming agent charging and mixing device according to the invention, liquid and in particular actively cooled foaming agent such as $CO_2$ can be supplied to a plastic melting during a discontinuous extrusion blow forming process and during continuous processes. The process steps of gas metering, distribution of the gas in the plastic melting, solving the gas in the melting and relief take place in the device module 1, which can also be retrofit for conventional plastics machines and which is for instance flange-mounted at the end of the plasticating screw.

For metering and adding the foaming agent, the closure valve 12 is closed and the barrel plasticating screw 25 supplies plastic melting via the non-return flap 14 to the mixing means 2. There, foaming agent is added in the area of the channel connection 17 and in particular adjacent to the side opening 9, see FIG. 2. The metering is performed in a pulsating manner, since among the inlet bores 6, 22 shown in FIG. 2, one is released by the mixing elements 19 or closing members 20 and the other one is closed. Subsequently or simultaneously, the mixing-in of the foaming agent takes place.

The plastic melting supplied with gas and mixed may enter the storage means 15 via the passage 27. According to the desired diffusion pressure, the piston can be expanded in a braked manner. The foaming agent mixed-in is solved under pressure in the plastic melting. Conventional pressures and temperatures are in this connection approximately 150° C. to 350° and approximately 200 to 400 bar.

After solving the foaming agent in the plastic melting, the closure valve 12 is opened and the plastic melting is pressed out of the collection means 15. Plastic melting can again be passed through the mixing means 2 to be post-mixed there. If desired, further foaming agent can be added or the foaming agent metering means 3 is out of function. The connection between the channel connection 17 and the plasticating screw 4 is locked by automatically closing the non-return flap 14. The plastic melting emerges into the mold 5 via the opened closure valve 12, relaxes there and foams. A high pressure gradient (bar/sec) can be generated through the discharge nozzle which enhances the foam quality. The foam may be characterized as being small-cellular, wherein an average cell size may exist in the range between 100 and 500 μm.

At the same time or chronologically offset to the discharge of the plastic melting from the collection means 15 into the mold 5, uncharged and non-foamable plastic melting may be supplied by a respective control of the barrel plasticating screw 25 through the non-return flap 14. Thus, a two-component operation of the foaming agent charging and mixing device is possible.

The device according to the invention is compatible with all conventional plastics machines and has a short overall length. A two-component operation in a chronologically successive and simultaneous manner is possible. The mixing process by means of the mixing means 2 is performed independent of the plasticating screw and a diffusion pressure in the plastic melting is independent from the pressure in front of the barrel plasticating screw 25. The metering of the foaming agent is performed in a pulsating manner and can be precisely metered. Furthermore, a double mixing process is given, wherein the plastic melting is mixed once during transport in the direction towards the storage means 15 and a second time during the transport from the storage means in the direction towards the mold 5.

The second embodiment according to FIG. 3 basically operates analogously to the first embodiment. A difference is in particular to be seen in that a two-component operation can be easily implemented by the directional switching means. In the position of the directional switching means according to FIG. 3, a supply of plasticized plastic material with mixed-in or solved foaming agent to the mold is performed directly from the collection means 15. A connection of the mold 5 in the direction towards the mixing means 12 or plasticating screw 4 is interrupted.

In a further position of the directional switching means 33, the bore 36 connects the discharge opening 10 with the side opening so that plasticized plastic material can be supplied to the mold 5 through the return valve 31 from the plasticating screw via its discharge end 8.

Therefore, the present invention overcomes the problems present in the prior art as outlined above. Neglecting any discussion for the time of the inventive aspects of the invention relating to forming composite plastic parts, it must be noted that the inventive general arrangement:

1) Introduces the foaming or blowing agent into the melt downstream and in a separate device from the injection screw/barrel where the melt is produced. Thus, the contamination problem inherently present in the prior art discussed above is avoided and the function of mixing can become optimized because it is separately controlled.

2) The foaming agent is introduced in the preferred embodiment as a liquid. Expensive equipment for forming supercritical gas is avoided. That is to say: the blowing agent is simply supplied from a conventional, pressurized bottle of blowing agent, i.e. $CO_2$. The bottle connects to a conventional pump which in turn is connected to the arrangement shown in FIG. 7 for feeding pressurized liquid blowing agent to a gear pump 18. Preferably the foaming or blowing agent is $CO_2$ which has been found to have properties that allow it to remain in liquid form when introduced into the mixing chamber while possessing good solubility within the melt as a supercritical fluid (and also this forming agent is environmentally benign). As noted above, it is desired to retain the blowing agent in liquid form until introduction into the melt in mixing chamber and it is possible to provide a water cooling jacket in bearing 24 although it is not necessary for $CO_2$.

3) The kneading elements are especially effective to produce the solution of the melt/blown agent in the cycle time required for an injection molding machine.

Without necessarily wishing to be bound by any theories as to how the invention works to achieve foamed plastic, it has been found that by utilizing a foaming agent in liquid form it can be accurately metered, such as by the gear pump disclosed with the fixed fluid volume between gear teeth. The rotation of the gear pump then produces discrete volumes of foaming agent at higher pressure than the melt so that the foaming agent penetrates the melt. The liquid does not require orifices for the blowing agent top penetrate the melt and clogging, therefore, cannot be a problem. The discrete volumes are believed to form bubbles of foaming agent within the melt and the bubbles get progressively reduced in size as they pass between the kneaders of the mixing element and form a solution with the melt. When compared to the prior art discussed above, it may be that the bubbles of foaming agent in the present invention when introduced into the melt are larger than bubbles formed form supercritical gas injected through orifices of the prior art and this may account for a difference between the two concepts which conceivably could contribute to the fact that the present invention does not produce foamed cells of the small "microcellular" sizes (less than 50 microns) said to be achieved by the prior art. Nevertheless, the kneading elements of the mixing device have been found to place the foaming agent into solution with the melt and produce excellent molded foamed parts. More importantly perhaps, it is believed that because of the kneading element arrangement disclosed, mixing of the blowing or foaming agent into the melt can occur in a relatively short cycle time but not at the full saturation limit of the melt. It is believed that the cycle times (equal to that of conventional injection molding machine) do not permit a dissolution of the maximum concentration of $CO_2$ possible, but in all instances permit a lesser concentration of foaming agent which is more than sufficient to permit the formation of foamed plastic having cell sizes of approximately 50 to 400 microns at densities of $10 \times 5$ cells per cc. In general summary, the utilization of a separate mixing chamber is made particularly advantageous in the preferred embodiment using $CO_2$ blowing agent because of the combination of the gear pump placing a liquid blowing agent not in a supercritical state into the path leading to the mixing chamber having the kneaders 19 of the type described in FIG. 5 and illustrated generally in FIG. 1.

Significantly the device can be easily controlled so that desired level of saturation of the foaming agent within the melt occurs in a timed event. The control system of the injection molded machines are microprocessor systems which are designed to control a wide range of additional "add-on" functions, such a robotic mold ejection functions. The rotation of the gear pump can be readily timed with the injection of the melt (during the injection stroke of the reciprocating in-line screw) to produce a fixed quantity of blowing agent pulsed to the melt. Introduction of excessive amounts of blowing agent which do not go into solution with the melt or are otherwise injected into the mold causing defective moldings is avoided. The rotation of the kneading elements within the mixer can be controlled to assure the foaming agent is dissolved into or forms a solution with a melt. The shot-pot injection can be independently controlled. Ideally for minimum cycle time, the shot-pot piston injects while the screw recovers or meters the next shot, but this is not necessary. All of this can be implemented into existing control systems so that not only the conventional clamp and inject units of conventional injecting molding machines are used, but also the conventional control system for such machines can control the process to produce minimum cycle time.

Finally in the operation of the mixer, the state of the mixture is retained relatively constant. That is to say heating element (not shown) can and are provided to the mixing station but the temperature of the melt/foaming agent mixture is maintained generally constant throughout the mixing station, the shot-pot and the injection passage to the mold. Generally the mixing station function is to produce a desired concentration of blowing agent into solution with the melt and maintain this solution without any change until the solution is injected into the mold. When and as the solution enters the mold it rapidly forms many bubbles and expands into the expanded cell sizes described above. The variable programmed into the mixing station are the injection pressure and the cycle time.

The invention claimed is:

1. A foaming agent charging and mixing device, comprising:
    at least one mixing means; and
    a foaming agent metering device, wherein the foaming agent charging and mixing device is arranged between a plasticating screw and a mold, and the foaming agent metering device is configured to be alternately opened and closed for supplying a foaming agent to a plastic melting processed by the mixing device and wherein the mixing device further comprises a closing member configured to alternately open and close the foaming agent metering device.

2. The foaming agent charging and mixing device as claimed in claim 1, wherein the foaming agent charging and mixing is formed as a module, which may be arranged releasably between the plasticating screw and the mold.

3. The foaming agent charging and mixing device according to claim 1, wherein the foaming agent metering device comprises at least two inlet bores opening into a device housing, said bores being reciprocally opened and closed by the mixing means.

4. The foaming agent charging and mixing device according to claim 3, wherein the foaming agent charging and mixing device extends transversely to a longitudinal direction of the plasticating screw, and side openings connectable to a discharge end of the plasticating screw are formed in the device housing.

5. The foaming agent charging and mixing device according to claim 4, wherein the device housing comprises at least one collection device for plastic melting.

6. The foaming agent charging and mixing device according to claim 5, wherein the collection device is releasably attached to the device housing, and comprises a piston-cylinder unit.

7. The foaming agent charging and mixing device according to claim 6, wherein a channel connection is formed between a side opening and the collection device and/or between a discharge opening and the collections device, and the mixing device is arranged in the channel connection.

8. The foaming agent charging and mixing device according to claim 1, wherein the mixing device comprises at least one mixing shaft and mixing elements outwardly projecting therefrom.

9. The foaming agent charging and mixing device according to claim 8, wherein the foaming agent metering device is closeable by mixing elements and/or closing elements outwardly projecting from the mixing shaft upon rotation of the mixing shaft.

10. The foaming agent charging and mixing device according to claim 5, wherein a directional switching device is arranged in the device housing, said directional switching device being switchable between a supply directly from the plasticating screw or the collection device to the mold.

11. The foaming agent charging and mixing device according to claim 1, wherein the foaming agent metering device comprises a reciprocating pump, and a linear drive having an integrated path measuring system is associated to the reciprocating pump.

12. The foaming agent charging and mixing device according to claim 1, which comprises a directional switching device is provided configured to, be switched between a supply of a material from at least two different sources to a consumer, the directional switching comprises an external body and an internal body rotatably supported therein, and an outlet of the external body may be connected to at least one of two inlets of the external body by a connection channel arranged eccentrically in the internal body.

13. The foaming agent charging and mixing device according to claim 12, wherein the connection channel extends substantially along an axis of rotation of the cylindrical internal body and comprises a number of branching channels to which at least two outlets and/or inlets in the external body can be assigned by rotation.

14. An injection molding machine for molding foamed plastics having a conventional inline reciprocating plasticizing screw and a conventional clamp or clamping mold, which machine comprises a mixing device interposed between the clamp and the plasticizing screw, the mixing device having a first inlet in fluid communication with the screw and an outlet in fluid communication with the mold through a shut-off valve and a second inlet, and a metering device for pulsing a foaming or blowing agent into the second inlet when the screw is axially translating to inject a set quantity of plastic into the mixing chamber.

15. The infection molding machine of claim 14,
    wherein the metering device has kneading elements for mixing the blowing agent into solution with the melt.

16. A foaming agent charging and mixing device, comprising:
    a housing having an opening in communication with a plasticating screw and another opening in communication with a mold;
    a mixing shaft rotatably supported inside the housing, the mixing shaft comprising a plurality of mixing elements circumferentially disposed and projecting from a surface of the mixing shaft at several axial locations along the mixing shaft; and
    a foaming agent meter having at least two inlet bores, the foaming agent meter being disposed inside of the housing with the mixing shaft passing therethrough, wherein, when the mixing shaft rotates, a flow of a foaming agent through the foaming agent meter discharged into a molten plastic processed by the foaming agent charging and mixing device is pulsated by the intermittent opening and closing of the inlet bores by a closing member projecting from the surface of the mixing shaft.

17. An injection molding machine for molding foamed plastics comprising the foaming agent charging and mixing device according to claim 16.

* * * * *